United States Patent
Strupinski

(10) Patent No.: US 9,067,796 B2
(45) Date of Patent: Jun. 30, 2015

(54) METHOD OF GRAPHENE MANUFACTURING

(75) Inventor: Wlodzimierz Strupinski, Warsaw (PL)

(73) Assignee: INSTYTUT TECHNOLOGII MATERIALOW ELEKTRONICZNYCH, Warsaw (PL)

( * ) Notice: Subject to any disclaimer, the term of this patent is extended or adjusted under 35 U.S.C. 154(b) by 237 days.

(21) Appl. No.: 13/154,920

(22) Filed: Jun. 7, 2011

(65) Prior Publication Data

US 2011/0300058 A1 Dec. 8, 2011

(30) Foreign Application Priority Data

Jun. 7, 2010 (PL) ........................................ 391416

(51) Int. Cl.
| C01B 31/04 | (2006.01) |
| B82Y 30/00 | (2011.01) |
| B82Y 40/00 | (2011.01) |

(52) U.S. Cl.
CPC ......... *C01B 31/0461* (2013.01); *C01B 31/0438* (2013.01); *C01B 31/0446* (2013.01); *C01B 31/0453* (2013.01); *B82Y 30/00* (2013.01); *B82Y 40/00* (2013.01)

(58) Field of Classification Search
USPC ............................ 423/448; 438/478; 427/333; 257/E21.09; 977/734, 842, 843; 117/88, 97, 101, 102
See application file for complete search history.

(56) References Cited

U.S. PATENT DOCUMENTS

| 7,619,257 B2* | 11/2009 | Pfeiffer ............................ 257/76 |
| 9,006,644 B2* | 4/2015 | Sutter et al. .................... 250/251 |
| 2007/0102111 A1* | 5/2007 | Monsma et al. ............... 156/296 |
| 2008/0054412 A1* | 3/2008 | O'Loughlin et al. .......... 257/627 |
| 2009/0261456 A1* | 10/2009 | Schauer et al. ................ 257/618 |
| 2011/0269299 A1* | 11/2011 | Zhang et al. ................... 438/478 |
| 2013/0171347 A1* | 7/2013 | Yakimova et al. ............. 427/227 |

OTHER PUBLICATIONS

Sutter et al., "Epitaxial graphene on ruthenium," 2008, Nature Materials, vol. 7, pp. 406-411.*
Emtsev et al., "Towards wafer-size graphene layers by atmospheric pressure graphitization of silicon carbide," 2009, Nature Materials, vol. 8, pp. 203-207.*
Emtsev et al., "Interaction, growth, and ordering of epitaxial graphene on SiC{0001} surfaces: A comparative photoelectron spectroscopy study," 2008, Physical Review B, 77, pp. 155303-1-155303-10.*
Krupka et al., "Measurements of the sheet resistance and conductivity of thin epitaxial graphene and SiC films," 2010, Applied Physics Letters, 96, pp. 082101-1-082101-3.*
Weingart et al., "Influence of the growth conditions of epitaxial graphene on the film topography and the electron transport properties," 2010, Physica E, 42, pp. 687-690.*
Drabińska et al., "Growth kinetics of epitaxial graphene on SiC substrates," 2010, Physical Review B, 81, pp. 245410-1-245410-4.*

(Continued)

*Primary Examiner* — Guinever S Gregorio
(74) *Attorney, Agent, or Firm* — Westerman, Hattori, Daniels & Adrian, LLP

(57) ABSTRACT

A method for manufacturing graphene by vapor phase epitaxy on a substrate comprising a surface of SiC, characterized in that the process of sublimation of silicon from the substrate is controlled by a flow of an inert gas or a gas other than an inert gas through the epitaxial reactor. Graphene obtained by this method.

20 Claims, 5 Drawing Sheets

(56) References Cited

OTHER PUBLICATIONS

Strupinski et al., "Graphene Epitaxy by Chemical Vapor Deposition on SiC," 2011, Nano Letters, 11, pp. 1786-1791.*

Alfonso Reina et al., "Large Area, Few-Layer Graphene Films on Arbitrary Substrates by Chemical Vapor Deposition", Nano Letters, 2009 American Chemical Society, vol. 9, No. 1, pp. 30-35, published Dec. 2008.

* cited by examiner

METHOD OF GRAPHENE MANUFACTURING

TECHNICAL FIELD

The present invention relates to a method for manufacturing graphene. More specifically, the invention relates to a method of obtaining graphene by vapour phase epitaxy and a method of controlling its growth and nucleation within such a process.

BACKGROUND

Graphene is a flat two-dimensional sheet of carbon atoms arranged on d hexagonal lattice resembling a honeycomb, with two atoms per unit-cell [K. S. Novoselov, et al. *Science* 306,666 (2004), A. K., Geim, K. S. Novoselov, Nat. Mat. 6 (2007) 183, Y. B. Zhang, Y. W. Tan, H. L. Stormer, and P. Kim, *Nature* 438, 201 (2005)]. Carbon atoms are in the $sp^2$-hybridized state. Each of them is attached to three other carbon atoms by sigma type bonding. The electronic structure of graphene is rather different from usual three-dimensional materials. Its Fermi surface is characterized by six double cones. In intrinsic (undoped) graphene the Fermi level is situated at the connection points of these cones. Since the density of states of the material is zero at that point, the electrical conductivity of intrinsic graphene is quite low. The Fermi level can however be changed by an electric field so that the material becomes either n-doped (with electrons) or p-doped (with holes) depending on the polarity of the applied field.

Close to the Fermi level the dispersion relation for electrons and holes is linear. Since the effective masses are given by the curvature of the energy bands, this corresponds to zero effective mass. The equation describing the excitations in graphene is formally identical to the Dirac equation for massless fermions which travel at a constant speed. The connection points of the cones are therefore called Dirac points.
Numerous experiments conducted in recent years confirmed that electrons in graphene behave like Dirac fermions, being characterized by an anomalous quantum effect, and that transport in graphene is of a ballistic nature [M. L. Sadowski, G. Martinez, M. Potemski, C. Berger, and W. A. de Heer, Phys. Rev. Lett. 97, 266405 (2006, D. L. Miller, K. D. Kubista, G. M. Rutter, et al., *Science* 324, 924 (2009)]. The exceptional electron properties of graphene and its high chemical stability make it a particularly attractive candidate for future electronics devices [Novoselov K. S., Geim A. K., *Nature Materials* 6, 183 (2007)]. Carriers mobility in graphene is significantly high, reaching up to 200000 cm2/Vs, which is more than one order of magnitude higher than in the case of silicon transistors [Lin Y. M. et al, *Science* 327, 662 (2010)]. This ensures ballistic transport over distances of the order of several micrometers. In addition, current density in graphene stays over 100 times higher than in copper (108 A/cm2) [M. Wilson, Phys. Today, p. 21 (January 2006)].

Graphene can be obtained by several methods. The first one, developed by K. S. Novoselov and A. K. Geim, is the mechanical exfoliation of bulk graphite with a strip of scotch tape until single layer of graphene is obtained. The produced flakes exhibited outstanding high carriers mobility. Since this method allows making only small size samples of graphene, (from few hundred to several thousand square micrometers) and an inefficient flakes selection process. It was not a practical method for a mass production.

The second method, devised by W. de Heer i C. Berger [C. Berger, Z. Song, T. Li, et al., J. Phys. Chem., B 108, 19912 (2004), W. A. de Heer. C. Berger, X. Wu, et al, *Solid State Commun*, 143, 92 (2007), K. V. Emtsev et al., *Nat. Mater,* 8, 203 (2009)] on the basis of earlier reports [A. J. Van Bommel, J. E. Crombeen, and A. Van Tooren, *Surf. Sci.* 48, 463 (1975), I. Forbeaux, J.-M. Themlin, and J.-M. Debever *PHYSICAL REVIEW B VOLUME* 58, *NUMBER* 24 (1998)] on graphitization of a silicon carbide surface, consists in obtaining a thin carbon layer on a SiC surface in vacuum conditions as a result of silicon sublimation at high temperatures reaching above 11000 C. At such temperatures, silicon evaporates from the surface, which, in turn, becomes rich in carbon. The carbon present on the surface is stable even in the form of one or two atoms layers. That is how graphene with thickness from several to tens of carbon atoms layers can be obtained. The growth rate of graphene is controlled by the production of the initial partial pressure of silicon in the reaction chamber, generated during SiC sublimation, and by subsequent conducting the process under conditions close to equilibrium. A variant of the method proposed in [K. V. Emtsev et al., *Nat. Mater.* 8: 203 (2009), W. Strupiński, et al, *Mater. Science Forum Vols.* 615-617 (2009)] enables graphene growth under the argon atmosphere at either reduced or atmospheric pressure. By adjusting the pressure (from 100 mbar to 1 bar) and the temperature of the process (from 1100° C. to 1800° C.), one controls the graphene growth rate. The described method is currently the most widely used one. Disadvantages of this method include: difficulty in obtaining the equilibrium pressure of Si in vacuum conditions, which limits its industrial use, and dependence of graphene quality on the quality of a SiC substrate out of which silicon sublimation occurs, which leads to inhomogeneities in graphene parameters.

Yet another method is to deposit carbon atoms layers on metallic surfaces such as nickel, tungsten or copper. A commonly known CVD (Chemical Vapour Deposition) technique for deposition of thin films is applied in this case. Carbon sources include methane, propane, acetylene and benzene, all of which are decomposed at a high temperature. Released carbon deposits on a metallic substrate. In electronic applications, a subsequent indispensable step is to detach graphene from a conductive metal (by dissolving the metal in chemical reagents) and place it on an isolated substrate [Kim, K. S., et al., *Nature* 2009, 457, Reina, A., et al., *J. Nano Lett.* 2009, 9]. The method of graphene relocation has serious limitations that impede the industrial implementation. During relocation, graphene splits into smaller parts, Apart from that, the metal surface is not sufficiently smooth, when compared to the silicon carbide surface.

There are also two other methods of obtaining graphene consisting of chemical reduction of graphene oxide [Park, S.; Ruoff, R. S. Nat. *Nanotechnol.* 2009, 4, 217-224, Paredes, J. I.; Villor-Rodii, S., et al., Langmuir 2009, 25 (10), 5957-5968] as well as dissolution of graphite in solvents [Blake, P. Brimicombe, P. D. Nair, et al., Nano Left. 2008, 8 (6), 1704-1708, Hernandez, Y. Nicolosi, V. Lotya, et al. *J. N. Nat. Nanotechnol.* 2008, 3, 563-568] followed by evaporation of solid phase extraction of carbon in the form of thin flakes. However, graphene obtained by these methods is of particularly low quality.

In the case of epitaxy of carbon (CVD), SiC (silicon carbide) substrate, which, depending on the needs, is characterised by either high resistance (semi-insulating) or low resistance, proves attractive and suitable for electronic applications. (Conductive metallic substrates with a graphene layer make the manufacture of e.g. a transistor impossible). A CVD process requires high temperatures. The lower range is limited by the temperature of thermal decomposition of a gaseous carbon precursor (around 1000° C.); however, the growth of graphene of required structural quality needs to be performed at the temperatures in the range from 1500 to 1800° C. That temperature leads to SiC substrate decomposition or, in other words, silicon sublimation, which is disadvantageous from the point of view of epitaxy. Graphene growth by Si sublimation occurs (from about 1300° C.) before the temperature of epitaxial growth is achieved. Therefore, first carbon atoms layers, which are the most important for graphene parameters, will be formed by commonly known silicon evaporation, not by CVD epitaxy. Also, after CVD epitaxy is finished, uncontrolled sublimation will take place, causing further undesirable growth of successive carbon layers. Hence, the aim of the present invention is to propose a method for manufacturing graphene by vapour phase epitaxy (CVD), in which SiC substrates may be used owing to the control over the process of silicon sublimation from such a substrate. The present invention also aims to promote graphene nuclei growth on a SiC substrate by controlled silicon sublimation from this substrate and then deposition of epitaxial graphene layers on the thus obtained nuclei with a defined geometry (of an island). Application of CVD epitaxy for graphene manufacturing allows for the growth of thicker turbostatic graphene layers on a C-face (000-1) of a SiC substrate but also on a Si-face, which is not achievable in the case of Si sublimation. In addition, interrupting the CVD epitaxial growth and incorporating chemically reactive dopants enables the modification of graphene electron structure (energetic separation of Fermi level and the Dirac point). It is crucial however that the interruption of graphene growth is not followed by further uncontrolled process of sublimation or etching.

SUMMARY

According to the present invention, the method of obtaining graphene through its vapour phase epitaxy on a substrate comprising a surface of SiC is characterized in that the process of silicon sublimation from the substrate is controlled by a flow of an inert gas or a gas other than an inert gas through the epitaxial reactor. More particularly, by the linear speed of gas molecules flowing above the surface of the SiC substrate wafer. This enables deposition of single carbon layers.

Preferably, said gas flow rate varies from 6 l/min to 70 l/min or, even more preferably from 18 l/min to 26 l/min. The average linear velocity of the gas flowing through the reactor has to be higher than 3 cm/s or higher than the value characteristic for this particular reactor.

In other preferred embodiment, said gas flow rate is lower than 6 l/min, which completely prevents silicon sublimation from the substrate. The average linear velocity of the gas flowing through the reactor has to be lower than 3 cm/s or lower than the value characteristic for this particular reactor.

In one embodiment of the present invention, initially inert gas flow rate is used in the range of 6 l/min to 70 l/min or, more preferably, 18 l/min to 26 l/min, which allows the formation of graphene nuclei on the SiC substrate surface in the process of controlled silicon sublimation from the substrate. Subsequently, inert gas flow rate is decreased to less than 6 l/min, preventing further silicon sublimation and vapour phase epitaxy on thus obtained nuclei is performed. When using gas other than inert gas, sublimation rate must dominate over the reaction rate of gas with an emerging carbon layer on the wafer surface.

The aforesaid flow rates were adjusted to a particular epitaxial reactor, namely the VP508 system produced by Aixtron, Germany. The gas flow rate of 26 l/min could be increased (without affecting the growth process), but this is the upper range value of the flowmeter in said device. In reactors with different geometries, flow rates may be different and have to be chosen experimentally in accordance with the principles known to those skilled in the art. The results of simulations of the gas flow through the reactor, including quantum phenomena, can also be used. Experimental verification is required.

Preferably, epitaxy is preceded by substrate etching at temperatures from 1400° C. to 2000° C. or, even more preferably from 1400° C. 1700° C.

In the preferred embodiment of the present invention, said etching takes place at pressures from 10 mbar to 1000 mbar or, even more preferably from 50 mbar to 100 mbar.

Etching can be also conducted at higher pressures; however, there is no motivation to this since pressure has to be reduced after etching anyhow to perform epitaxy. It was not found that etching higher pressures results in its higher quality.

Preferably, said etching takes place in a gas atmosphere which contains hydrogen. Even more preferably, the aforesaid atmosphere contains in addition propane, silane, their mixtures or other hydrocarbons.

Preferably, said etching is performed at said gas flow rates from 3 l/min to 90 l/min or, even more preferably from 70 l/min to 90 l/min.

According to the present invention, if said etching is performed in atmosphere which contains hydrogen, the used hydrogen flow rate is preferably from 70 l/min to 90 l/min. If said etching is performed in atmosphere which contains shone, the used silane flow rate is preferably from 1 ml/min to 100 ml/min or, even more preferably from 5 ml/min to 10 ml/min. If said etching is performed in atmosphere which contains propane, the used propane flow rate is preferably from 1 ml/min to 100 ml/min or, even more preferably from 5 ml/min to 10 ml/min.

Preferably, substrates of SiC, having one of the following polytypes are used: 4H—SiC, 6H—SiC or 3C—SiC.

Preferably, epitaxy is then performed on the side of the substrate having Si polarity.

In the preferred embodiment of the present invention said inert gas is a noble gas, preferably argon.

If said inert gas is argon, the preferred argon pressure varies from $10^{-4}$ mbar to the atmospheric pressure.

Argon is an optimal choice for the method according to the present invention. The remaining inert gases also prove suitable for epitaxy but, in practice, are very rarely used due to their high price and limited availability of both these gases and purifiers. Using inert gases other than argon requires change in aforesaid flow rates due to—different than for argon—mass of a gas molecule. One can use non-inert gases, such as hydrogen, if process parameters cause domination of the process of a carbon layer production over etching.

In the preferred embodiment of the present invention, said inert gas is argon, a substrate of SiC is kept at temperatures above 1100° C. and the product of the argon pressure in the reactor and the argon flow rate through the reactor is adjusted such that a stagnant argon layer and successive argon layers with sufficiently low linear speed, preventing silicon sublimation, are created over the substrate surface, which blocks silicon sublimation from the surface of the SiC substrate.

The invention also includes graphene obtained by the aforementioned method.

BRIEF DESCRIPTION OF DRAWINGS

The present invention will be described in greater detail in preferred embodiments, with reference to the accompanying drawing in which.

PREFERRED EMBODIMENTS OF THE INVENTION

Example 1

Figure 1:
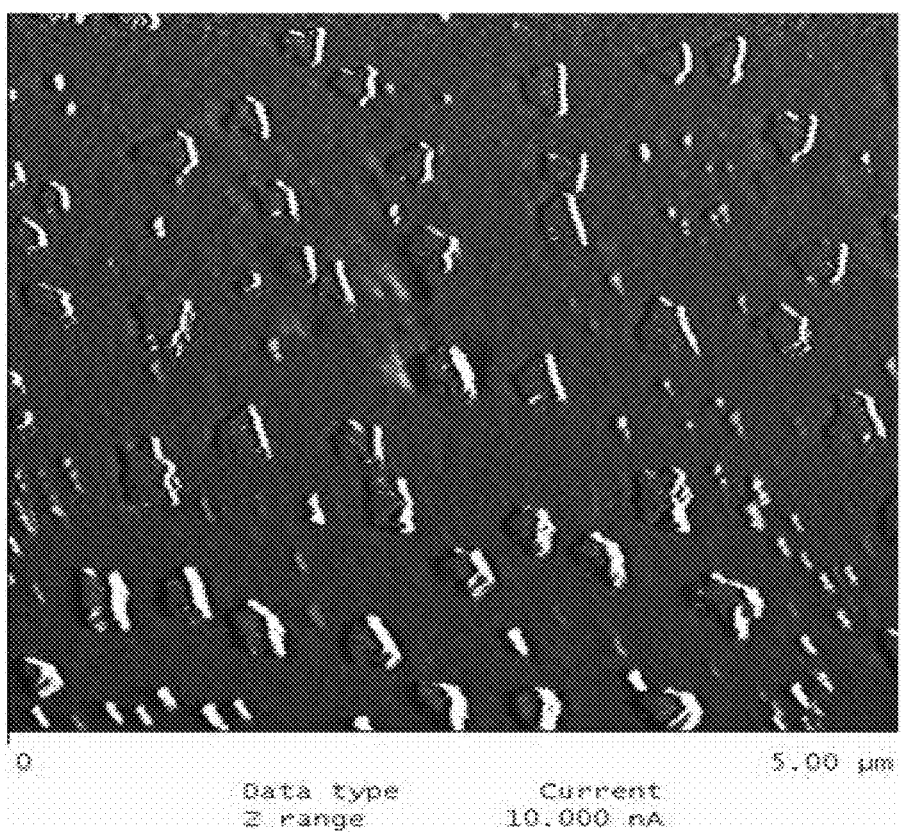
FIG. 1 presents a tunneling microscope image of isolated graphene islands.

A commercial VP508 reactor (FIG. 1) and commercial silicon carbide substrates of polytypes 4H—SiC, 6H—SiC or 3C—SiC and having orientation (0001) or (000-1) were used to perform graphene epitaxy by CVD (Chemical Vapour Deposition). Substrates with off-cut angles of 0 to 8 degrees available from manufacturers such as Cree (USA) and SiCrystal (Germany) were also employed. Substrate surfaces (so called "epi-ready") were beforehand prepared for SiC epitaxy by manufacturers. In addition, before proper graphene growth, substrates were etched in the epitaxial reactor in a mixture of hydrogen and propane or shone at the temperature of 1600° C. and the pressure of 100 mbar. The hydrogen flow rate was 60 l/min, whereas the propane/silane flow rate varied between 5 to 10 ml/min. Depending on the heater used, the size of substrates differed—from square samples with dimensions of 10 mm×10 mm to wafers with a diameter from 2 or 3 inches to 100 mm.

Figure 2:
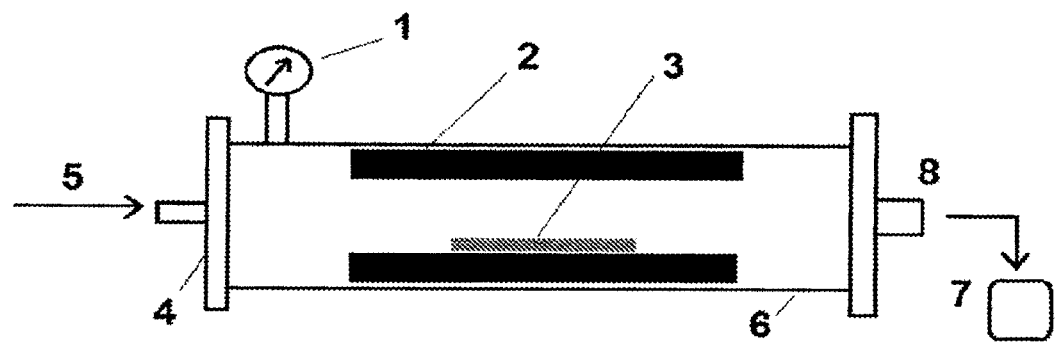
FIG. 2 presents a schematic diagram of the reaction chamber of the Aixtron VP508 system used to develop the present invention.
Figure 3A:
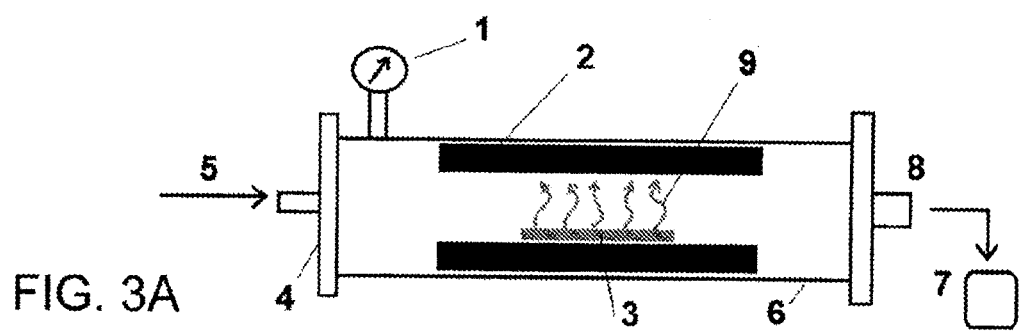
FIGS. 3A)-3E) present a control mechanism of silicon sublimation from a SiC substrate surface and a mechanism of graphene deposition by a propane CVD process.
Figure 3B:
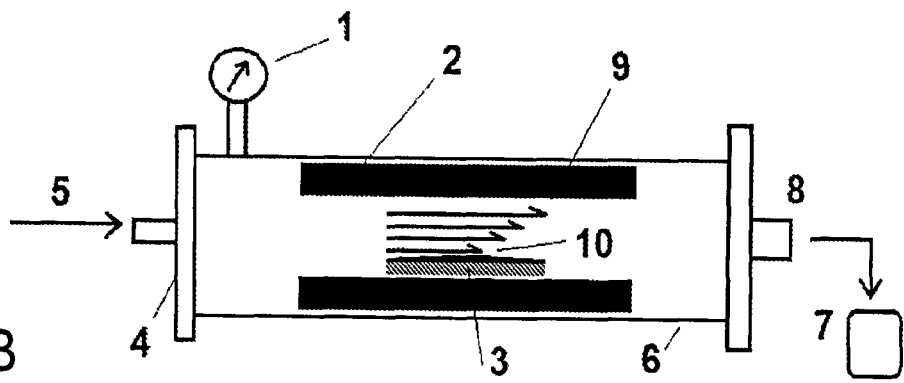
Figure 3C:
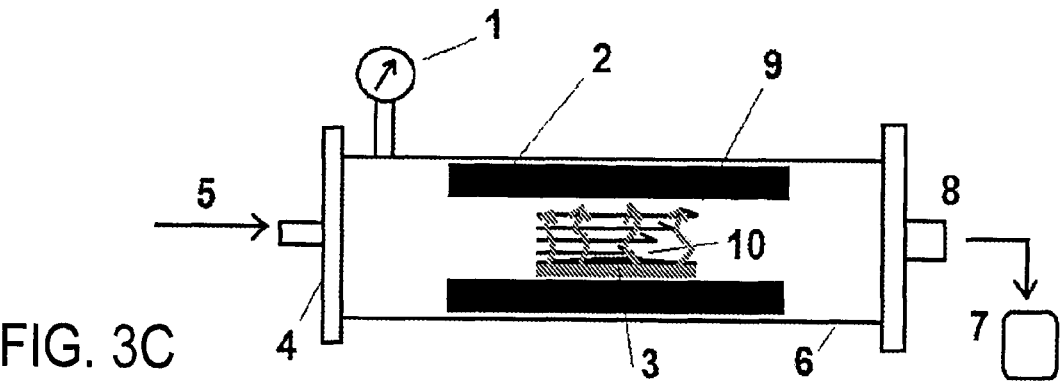
Figure 4A:
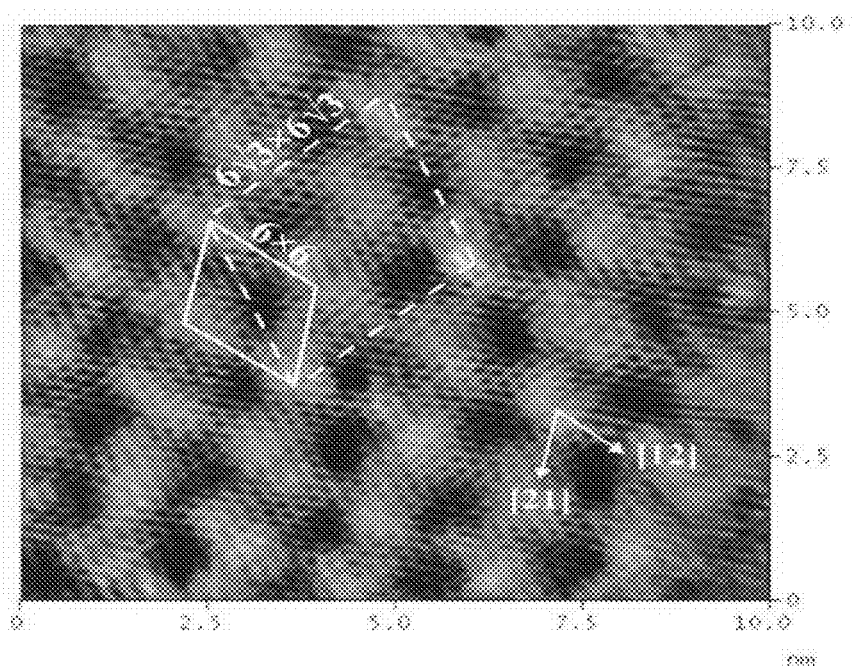
FIG. 4A) presents a tunneling microscope image, which proves that a thin graphene layer on a SiC surface was obtained in example 4.
Figure 4B:
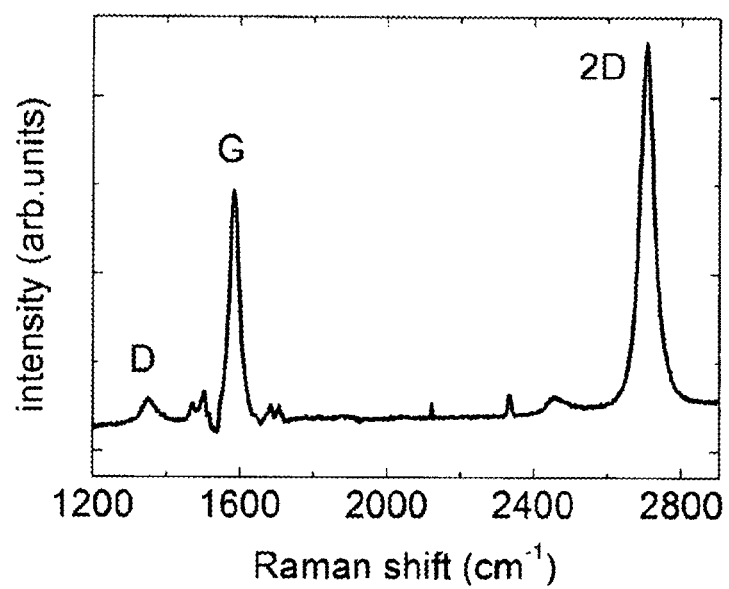
FIG. 4B) presents results of Raman spectroscopy, which prove that a thin graphene layer on a SiC surface was obtained in example 4, and Moreover, in FIG. 2 and FIGS. 3A)-3E) the following numerals are used: 1—pressure gauge, 2—heaters, 3—substrate, 4—chamber closure, 5—gas inlet, 6—quartz tube, 7—pump, 8—gas outlet, 9—Si sublimation, 10—argon, 11—graphene nuclei, 12—propane.

When annealed, SiC substrates 3 placed in the reactor (FIG. 2) undergo thermal decomposition (silicon sublimation from the surface). If annealing is performed in a hydrogen atmosphere, carbon formed on the surface reacts with hydrogen, as a result of which successive SiC layers become etched. Replacement of hydrogen with argon or using vacuum cause layering of carbon on a substrate surface resulting from thermal decomposition of successive SiC atomic layers (FIG. 3A). Silicon sublimation efficiency grows with increasing temperature and decreasing pressure. As a result of adequate reconstruction of carbon atoms, subsequent graphene layers are obtained on the surface. The applied argon 10 flow rote varies from $10^{-4}$ mbar to the atmospheric pressure. If the linear velocity of argon molecules above the substrate 3 surface is sufficiently high, the flowing gas does not inhibit sublimation 9. If said velocity is reduced below the critical value, being the product of the pressure in the reactor and the flow through the reactor expressed in l/min, a so-called "stagnant layer" of argon is created above the surface of the substrate 3. Successive layers, starting from the substrate 3, move with increasing velocity. Gas layers, the velocity of which depends on pressure and flow rate, inhibit silicon sublimation from the surface into the surrounding atmosphere (FIG. 3B). For a particular geometry of the reactor, the product of flow rate and pressure, characteristic for the process of the stagnant layer formation and the decrease in gas velocity of successive layers starting from the substrate will be different and is adjusted experimentally. In the case of the VP508 reactor, the argon 10 flow rate of 6 l/min and the pressure of 100 mbar were used in order to completely inhibit sublimation 9. If the argon 10 flow is increased to 26 l/min (for VP508), stagnant layer thickness will decrease, enabling again silicon sublimation 9 (FIG. 3C) (velocities of subsequent gas layers, starting from the first stagnant layer in contact with the substrate 3, will increase). Therefore, by adjusting the argon 10 flow rate one can regulate the thickness of the gas layer inhibiting Si sublimation 9 (the number of atomic gas layers of higher or lower velocity than a typical velocity to start/stop sublimation), thereby regulating the sublimation 9 efficiency, starting from the most efficient temperature and pressure in the reactor and continuing until sublimation 9 is completely blocked. That is how graphene layers can be obtained by sublimation in a precisely controlled manner, FIG. 4 presents a tunneling microscope image (A) and the result of measurements by Raman spectroscopy (B), which prove that a thin graphene layer on the SiC surface was obtained. Graphene thickness was determined by ellipsometry and was found to be 7 atomic carbon layers.

Example 2

Figure 3D:
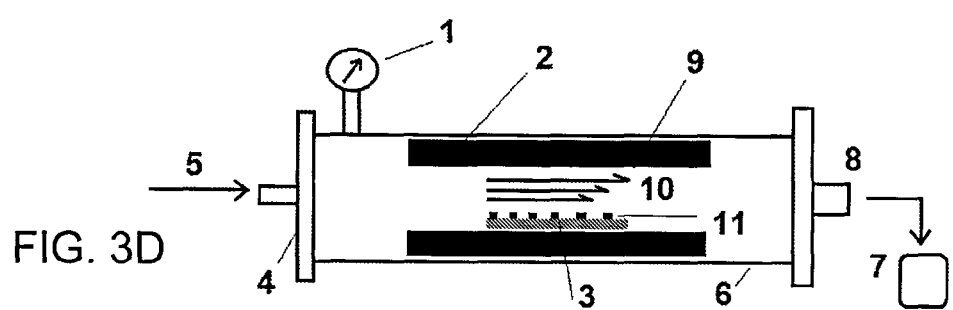

The procedure was analogous to that described in example 1, with the only difference that sublimation was performed for a very short period of time: at the pressure of 100 mbar and the argon flow rote of 26 l/min in 10 seconds or in 4 minutes at flow rate decreased to 20 l/min. By that, the growth of small objects (islands) of carbon 11 was induced on the SiC substrate 3 surface by starting sublimation within an appropriately short period of time (FIG. 3D), Carbon islands 11 can be optionally used for subsequent graphene growth as nuclei obtained by sublimation. FIG. 5 presents a tunneling microscope image presenting isolated graphene islands.

Example 3

Figure 3E:
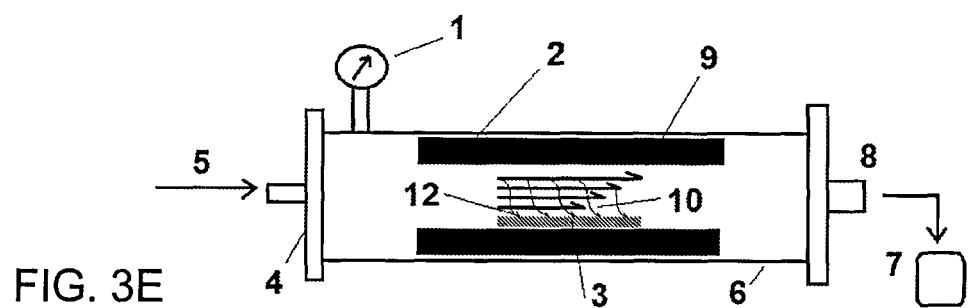

The procedure was analogous to that described in example 1, with the difference was that after etching a low argon 10 flow rate was applied (6 l/min, at the pressure of 100 mbar), not allowing silicon sublimation from the substrate surface. Graphene growth was performed as a result of a CVD process and introducing gas, namely 2 ml/min of propane 12 (FIG. 3E), into the reactor. Even though silicon sublimation is inhibited under such conditions, propane 12 molecules diffuse through the layers of slowly shifting or stagnant gas into the substrate 3 surface. As a result, a graphene layer of controlled thickness is deposited on the SiC surface, which did not undergo sublimation. Control is achieved by adjusting the propane 12 flow time through the reactor and the flow rate. Disconnecting propane 12 ends deposition. Graphene growth was performed on a SiC substrate 3 having (0001) and (000-1) surface. The obtained graphene was characterized by parameters similar to that of graphene obtained by sublimation, however, exhibiting a higher mobility of charge carriers. Graphene thickness measured by elipsometry can be controlled in the range of 1 to 100 (and more) carbon atoms layers.

Example 4

The procedure was analogous to that described in example 2, with the difference that after obtaining isolated graphene islands 11, sublimation was stopped by reduction of the argon 10 flow rate to 6 l/min and graphene growth by CVD, as in example 3, was started using the formerly obtained islands 11 as nuclei for growth by the CVD method. In this case, in the initial phase (1-2 atomic layers), the growth was lateral. This method is intended to enhance the quality of obtained graphene. Nevertheless, on the basis of currently available characterization methods it is yet hard to determine the impact of sublimation nuclei on the reduction of defects in graphene.

Example 5

The procedure was analogous to that described in example 3, with the difference that before graphene deposition, SiC epitaxy on a SiC substrate 3 was performed to enhance the quality of surface morphology. Graphene was then deposited on the thus modified substrate. A remarkable improvement in quality and better uniformity were achieved. Nevertheless, the main advantage of this method is a prominent reduction of the substrate 3 quality influence on the graphene growth process. Higher process repeatability was obtained. Graphene quality was confirmed by the results of Raman measurements made by observing the stability of a 2D peak of a carbon layer and the presence/amplitude of a D peak ("defects") related to perturbations graphene growth.

The invention claimed is:

1. A method of manufacturing graphene in an epitaxial reactor, comprising
    providing a substrate of SiC in the epitaxial reactor,
    introducing gaseous carbon precursor into the epitaxial reactor as an external carbon source,
    maintaining the SiC substrate at a temperature of above 1100° C. and
    depositing carbon on the SiC substrate by vapor phase epitaxial deposition,
    inhibiting or preventing sublimation of silicon from the SiC substrate by a flow of an inert gas or a gas other than an inert gas through the epitaxial reactor,
    wherein during said vapor phase epitaxial deposition the product of the inert gas or the gas other than the inert gas in the reactor and the inert gas or the gas other than the inert gas flow rate through the reactor is adjusted such that a stagnant layer of the inert gas or the gas other than the inert gas is created over the surface of said substrate, preventing silicon sublimation.

2. The method according to claim 1, wherein the flow of the inert gas is at a rate of from 6 l/min to 70 l/min.

3. The method according to claim 2, wherein said flow rate of said inert gas is from 18 l/min to 26 l/min.

4. The method according to claim 1, wherein the flow of the inert gas is at a rate lower than 6 l/min.

5. The method according to claim 1, wherein the flow of the inert gas is initially at a rate of from 6 l/min to 70 l/min, and subsequently the flow of the inert gas is lowered to a rate lower than 6 l/min.

6. The method according to claim 5, wherein the initial flow rate of said inert gas is from 18 l/min to 26 l/min.

7. The method according to claim 1, wherein said vapor phase epitaxial deposition is preceded by etching said substrate at a temperature of from 1400° C. to 2000° C.

8. The method according to claim 7, wherein said etching is performed at a pressure of from 10 mbar to 1000 mbar.

9. The method according to claim 7, wherein said etching is performed in a gas atmosphere containing hydrogen.

10. The method according to claim 9, wherein said gas atmosphere containing hydrogen additionally contains at least one compound selected from the group consisting of propane, silane, and other hydrocarbons.

11. The method according to claim 10, wherein said etching is performed in an atmosphere containing silane gas and with a silane gas flow rate from 1 ml/min to 100 ml/min.

12. The method according to claim 10, wherein said etching is performed in an atmosphere containing propane gas and with a propane gas flow rate from 1 ml/min to 100 ml/min.

13. The method according to claim 9, wherein said etching is performed with a hydrogen gas flow rate of from 5 l/min to 90 l/min.

14. The method according to claim 1, wherein said substrate is a substrate of SiC, having one of the following polytypes: 4H—SiC, 6H—SiC or 3C—SiC.

15. The method according to claim 14, wherein the vapor phase epitaxial deposition is performed on a side of the substrate having Si polarity.

16. The method according to claim 1, wherein said inert gas is a noble gas.

17. The method according to claim 16, wherein said inert gas is argon and the argon pressure is from $10^{-4}$ mbar to atmospheric pressure.

18. The method according to claim 1, wherein said inert gas is argon.

19. The method according to claim 1, wherein said gaseous carbon precursor comprises methane, propane, acetylene or benzene as said external carbon source.

20. The method according to claim 1, wherein said gaseous carbon precursor comprises propane as said external carbon source.

* * * * *